July 3, 1923.

1,460,393

W. T. SEARS
AXLE MILLING MACHINE
Filed Jan. 26, 1921

Inventor
Willard T. Sears
By Joseph K. Schofield
Attorney

Patented July 3, 1923.

1,460,393

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

AXLE-MILLING MACHINE.

Application filed January 26, 1921. Serial No. 440,020.

*To all whom it may concern:*

Be it known that I, WILLARD T. SEARS, a citizen of the United States, residing at Montclair, in the county of Essex and State of New Jersey, have invented certain new and useful Improvements in Axle-Milling Machines, of which the following is a specification.

This invention relates to milling machines and particularly to machines for milling cylindrical work such as shafts, axles and the like. Operations of this type are quite commonly performed by turning, however, under certain conditions and with certain classes of work, such operations may be more conveniently and accurately performed by milling. The invention herein has for its primary object the provision of mechanism particularly adapted to perform milling operations of the type stated.

It is an object of the invention to provide in combination with means for rotatably supporting a piece of work, improved means for rotatably mounting a cutter spindle, and means for rotating the spindle and simultaneously bodily moving the same transversely of its axis alternately in opposite directions along the work.

It is an object of the invention to provide, in combination with means for rotatably supporting a piece of work, improved means for bodily moving a cutter spindle in a circular path along the work and for simultaneously rotating the spindle.

More specifically, it is an object of the invention to provide a milling machine having means for rotatably supporting a piece of work thereon, a cutter carriage supporting a milling cutter spindle thereon, means for adjusting the carriage relative to the work, and means for simultaneously rotating the cutter and moving the same bodily over the work.

With the above objects particularly in view, the invention will now be described with reference to the drawing wherein.

Figure 1:
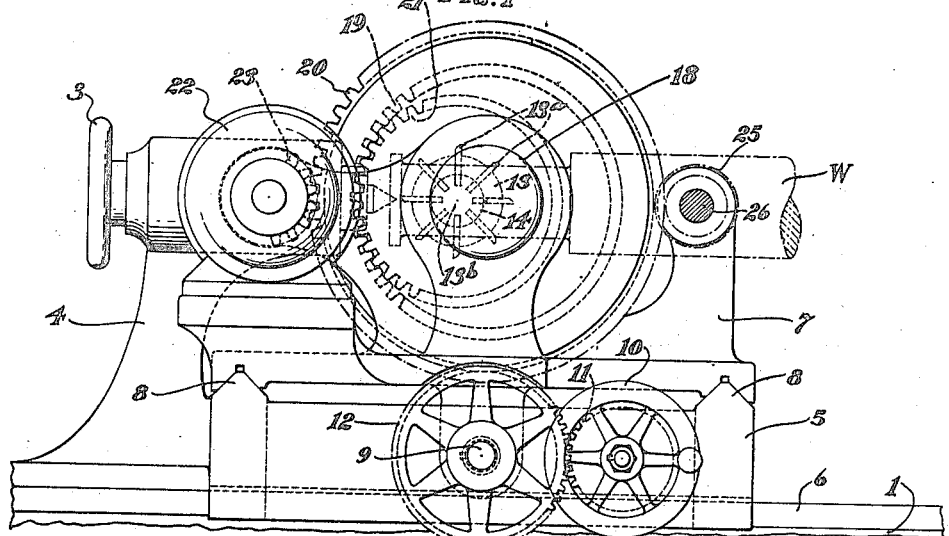
Figure 1 is a partial side elevation of a machine embodying the present invention.
Figure 2:
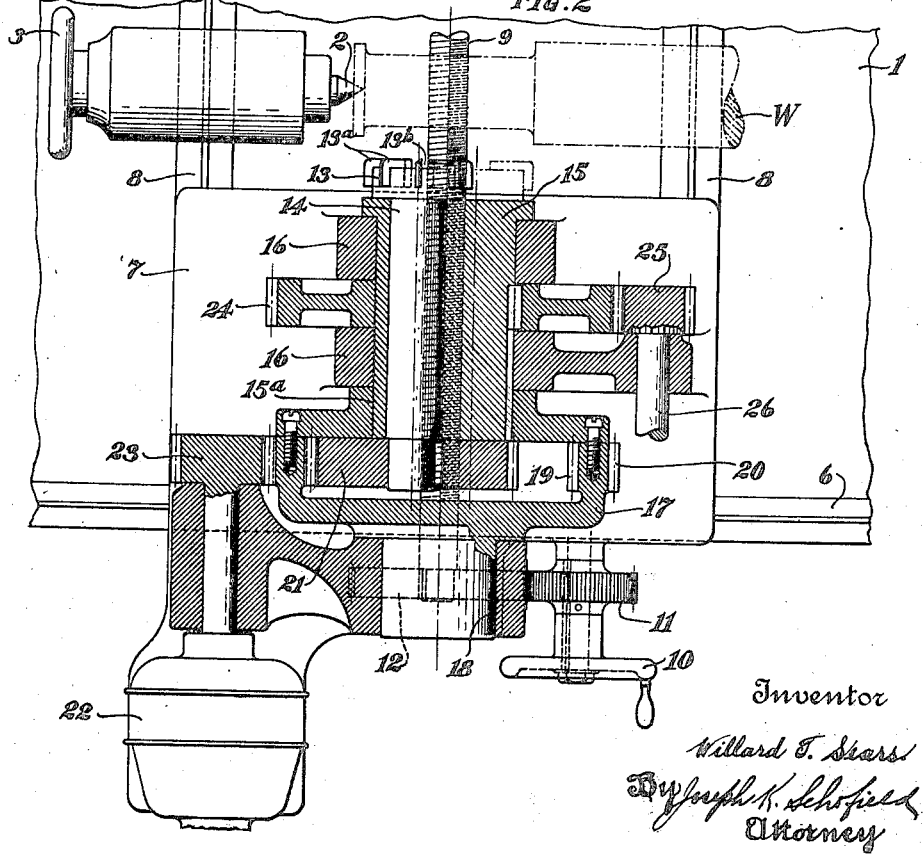
Fig. 2 is a plan view thereof, partly in section.

Referring more specifically to the drawing, 1 indicates the base of a milling machine. A work supporting center 2 adapted to be operated by a hand wheel 3 is mounted on a bracket 4 on the base, the center being adapted to rotatably support one end of a piece of work W. A carriage 5 is mounted to slide on ways 6 on the base. A cutter supporting slide 7 is mounted on ways 8 on the carriage and is adjustable thereon by means of a screw 9 journaled in the carriage. A hand wheel 10 and gears 11 and 12 serve to operate the screw to move the carriage toward and from the work. The work W is illustrated as being an axle the end of which is to be grooved out as illustrated. The milling cutter is preferably of a diameter less in extent than the portion of the work to be operated upon. The construction and operation of this mechanism will now be described.

13 designates an end milling cutter secured to a cutter spindle 14 mounted in a rotary bearing 15. The cutter preferably comprises a plurality of teeth $13^a$ arranged radially of the spindle, an opening $13^b$ being left at the center thereof as illustrated. It will be seen that were the cutter to be given only an axial movement toward the work, that portion of the work directly opposite the center $13^b$ would not be properly traversed by the cutter. In order to properly traverse the entire surface of the work to be milled, I preferably mount the cutter in a manner to give the same a bodily movement over the work in addition to its rotary movement. By this arrangement, the cutter is automatically and bodily moved transversely of its rotary axis alternately in opposite directions along the surface to be milled. As illustrated in the drawing, the cutter is mounted eccentrically in the supporting bearing 15 whereby the same is moved in a circular path. It will be understood, however, that the invention broadly contemplates the traversing of the cutter in any desired manner and the movement thereof in any desired path.

The cutter supporting bearing or drum 15 is mounted to rotate in bearings 16 on the slide 7. The cutter spindle 14 is mounted longitudinally and eccentrically in the bearing 15. For rotating the spindle in all positions thereof, I provide a member 17 rotatably mounted on the bearing 15 at the inner end $15^a$ and in a bearing 18 on the slide at the outer end. The inner portion of the member 17 is formed into an internal and external gear comprising teeth 19 and 20 respectively. The cutter spindle is driven from a gear 21 mounted thereon and in meshing engagement with the teeth 19. The member 17 is driven from a motor 22 mounted on the slide, a pinion 23 on the motor shaft meshing with the teeth 20 of the member 17. The bearing or drum 15 may be rotated by means of a gear 24 secured thereto and driven from a pinion 25 on a shaft 26, the shaft 26 being driven by a motor of any suitable power means.

In operation, the eccentricity of the mounting of the spindle in the bearing 15 is dependent upon the length of groove it is desired to cut in the work. Any desired variation in the bodily movement of the cutter being preferably provided by substituting a bearing 15 having the opening for receiving the spindle at the desired eccentric location therein. Whenever the eccentricity of the spindle 14 in its bearing is changed, the spindle driving gear 21 must also be changed accordingly in order that the gear will properly mesh with the teeth 19 of the driving member 17. The cutter is fed to the work by means of the hand wheel 10. As the work is rotated, the gears 24 and 25 rotate the bearing 15 to traverse the cutter the desired distance over the work. The spindle driving gear 21 is at all times in meshing engagement with the internal teeth 19 of the member 17 whereby the cutter is rotated in all its positions. It is believed that the construction and operation of the invention will be clear without further description thereof.

What I claim is:

1. A milling machine comprising in combination means for bodily moving and rotating a cutter spindle comprising a support, a rotary bearing mounted on the support, a cutter spindle mounted eccentrically in the bearing, a gear on the spindle, a member having teeth on the interior thereof meshing with the teeth of the said gear, and means for rotating the said member and bearing.

2. A milling machine comprising in combination means for bodily moving and rotating a cutter spindle comprising a support, a rotary bearing mounted on the support, a cutter spindle mounted eccentrically in the bearing, a gear on the spindle, a member having teeth on the interior and exterior thereof, the inner teeth meshing with the teeth of the said gear, a driving gear meshing with the outer teeth to rotate the member, and means for rotating the bearing.

3. An axle milling machine comprising in combination, a base, means thereon for rotatably supporting one end of a piece of work to be continuously rotated, a cutter carriage, a cutter spindle mounted on the carriage with its axis transverse to the rotary axis of the work and adapted to support a formed milling cutter, means for rotating the spindle, and means for automatically and bodily moving the spindle transversely of its axis alternately in opposite directions along the work as the work rotates whereby a circumferential groove of the form of the cutter is formed around the work piece.

4. An axle milling machine comprising in combination, a base, means thereon for rotatably supporting one end of a piece of work to be continuously rotated, a cutter carriage, a rotary bearing mounted on the carriage, a cutter spindle mounted eccentrically in the bearing with its axis transverse to the rotary axis of the work and adapted to support a formed milling cutter, means for rotating the cutter, and means for rotating the bearing to move the cutter in an eccentric path along the work as the work rotates whereby a circumferential groove of the form of the cutter is formed around the work piece.

5. An axle milling machine comprising in combination, a base, means thereon for rotatably supporting one end of a piece of work to be continuously rotated, a cutter carriage, a cutter spindle mounted on the carriage with its axis transverse to the rotary axis of the work and adapted to support a formed milling cutter, means for adjusting the carriage toward and from the work, means for rotating the cutter, and means for automatically and bodily moving the spindle transversely of its axis alternately in opposite directions along the work as the work rotates whereby a circumferential groove of the form of the cutter is formed around the work piece.

6. In an axle milling machine comprising in combination, a base, means thereon for rotatably supporting one end of a piece of work to be continuously rotated, a cutter carriage, a rotary bearing mounted on the carriage, a cutter spindle mounted eccentrically in the bearing with its axis transverse to the rotary axis of the work and adapted to support a formed milling cutter, means for adjusting the carriage toward and from the work, means for rotating the cutter, and means for rotating the bearing to move the cutter in an eccentric path along the work as the work rotates whereby a circumferential groove of the form of the cutter is formed around the work piece.

7. A milling machine comprising in combination, a base, means thereon for rotatably supporting a piece of work, a cutter carriage, a rotary bearing mounted on the carriage, a cutter spindle mounted eccentrically in the bearing with its axis transverse to the rotary axis of the work, a gear on the cutter spindle, means for driving the spindle through the gear, and means for rotating the bearing to move the cutter in an eccentric path along the work.

8. A milling machine comprising in combination, a base, means thereon for rotatably supporting a piece of work, a cutter carriage, a rotary bearing mounted on the carriage, a cutter spindle mounted eccentrically in the bearing with its axis transverse to the rotary axis of the work, a gear on the cutter spindle, a relatively large internal gear mounted coaxially of the bearing and in meshing engagement with the cutter spindle gear, and means for rotating the said bearing and internal gear.

9. A milling machine comprising in combination, a base, means thereon for rotatably supporting a piece of work, a cutter carriage, a rotary bearing mounted on the carriage, a cutter spindle mounted eccentrically in the bearing with its axis transverse to the rotary axis of the work, a gear on the cutter spindle, a relatively large internal gear mounted coaxially of the bearing and in meshing engagement with the cutter spindle gear, a motor mounted on the carriage and operatively connected to the internal gear, and means for rotating the bearing.

10. A milling machine comprising in combination, a base, means thereon for rotatably supporting a piece of work, a cutter carriage, a rotary bearing mounted on the carriage, a cutter spindle mounted eccentrically in the bearing with its axis transverse to the rotary axis of the work, a gear on the cutter spindle, a relatively large internal gear mounted coaxially of the bearing and in meshing engagement with the cutter spindle gear, a motor mounted on the carriage and operatively connected to the internal gear, a gear secured to the said bearing, and a gear meshing with the last named gear for rotating the bearing.

In testimony whereof, I hereto affix my signature.

WILLARD T. SEARS.